United States Patent [19]
Ikeda et al.

[11] Patent Number: 5,231,367
[45] Date of Patent: Jul. 27, 1993

[54] THERMAL RESPONSE SWITCH AND A SURGE ABSORBING CIRCUIT USING THE SAME

[75] Inventors: Fujio Ikeda; Masatoshi Abe; Takaaki Itoh, all of Saitama, Japan

[73] Assignee: Mitsubishi Materials Corporation, Tokyo, Japan

[21] Appl. No.: 906,272

[22] Filed: Jun. 26, 1992

[30] Foreign Application Priority Data

Jul. 2, 1991 [JP] Japan .................................. 3-188027

[51] Int. Cl.⁵ ...................... H01H 61/01; H01H 71/04
[52] U.S. Cl. ........................................ 337/28; 337/75; 337/31; 337/37; 337/66
[58] Field of Search .................. 337/14, 15, 27, 37, 337/52, 24, 72, 64, 85, 86, 75, 76, 67, 28, 16, 66; 361/119, 124, 105

[56] References Cited

U.S. PATENT DOCUMENTS

| | | | |
|---|---|---|---|
| 2,886,670 | 5/1959 | Dillon | 337/66 |
| 4,288,833 | 9/1981 | Howell | 361/124 |
| 4,635,021 | 1/1987 | Hsieh | 337/76 |

Primary Examiner—Harold Broome
Attorney, Agent, or Firm—McAulay Fisher Nissen Goldberg & Kiel

[57] ABSTRACT

A surge absorbing element is parallel connected to an electronic device via a pair of communication lines. A normally closed thermal response switch is serially connected between the electronic device and the signal source on the input side of the surge absorbing element. When a surge voltage is instantaneously applied to the communication lines, the thermal response switch remains in the closed position and the surge absorbing element acts to suppress the surge voltage. When an overvoltage or over current is continuously applied to the communication lines, the thermal response pieces of the thermal response switch open and simultaneously release the movable body. Consequently, the electronic device is disconnected from the signal source, thus stopping the continuous overvoltage or overcurrent from flowing to the electronic device and the surge absorbing element. Simultaneously, the reset pin is projected through the casing. After the temperature of the switch decreases, the switch is reset to the closed position by pushing a reset pin which reconnects the electronic device to the communication lines.

20 Claims, 2 Drawing Sheets

THERMAL RESPONSE SWITCH AND A SURGE ABSORBING CIRCUIT USING THE SAME

BACKGROUND OF THE INVENTION

1. Field of the Invention

This invention relates to a thermal response switch used for a surge absorbing circuit and to the circuit suitable for protecting electronic parts used for communication equipment, such as, telephones, facsimiles, telephone switchboards, modems and the like, from surge voltages and continuous overvoltages or overcurrents. More particularly, it relates to a surge absorbing circuit which prevents continuous overvoltages or overcurrents from flowing in electronic devices and absorbs surge voltages applied to the electronic devices.

2. Description of the Prior Art

In the prior art, a surge absorbing element, e.g., a gas charge tube, used in a surge absorbing circuit is parallel connected to the electronic device to be protected via a pair of input lines of the electronic device, and is designed to operate at a higher voltage than the operating voltage of the electronic device. Such a prior art surge absorbing element is a resistor having a high resistance when the voltage applied thereto is lower than the discharge voltage thereof and a resistance tens of ohms lower, when the voltage applied thereto is higher than the discharge starting voltage thereof. Accordingly, when surge voltages, such as, lighting surges, etc., are instantaneously applied to an electronic circuit including the surge absorbing element and the electronic device, the surge absorbing element discharges to suppress the surge voltages, and serves to protect the electronic device from the surge voltages.

However, when an overvoltage or overcurrent, e.g., due to an accident, is continuously applied to the electronic circuit, a certain amount of current continuously flows through the surge absorbing element. This results in the surge absorbing element being heated to high temperatures. The heat radiating from the surge absorbing element can cause the protected electronic device, as well as other electronic devices surrounding the surge absorbing element, to catch fire.

A typical example would be an accident wherein the input, i.e., signal or communication, lines of the electronic device contact the power lines thereof. While it does not usually happen that such accidental overvoltages are continuously applied to the surge absorbing element, to achieve maximum safety, it has recently become desirable to take additional safety measures to avoid such accidental problems and the potential fires caused thereby. As an example, UL (Underwriter's Laboratories Inc.) of the U.S.A prescribes a safety standard for surge absorbing elements so that they do not cause fire or electrical shock in communication equipment surrounding the surge absorbing element when continuous overvoltages or overcurrents are applied.

PCT Patent Application No. JP90/01006 discloses a surge absorber comprising a surge absorbing element used for suppressing the surge voltages and a metal wire connected in series to the surge absorbing element to prevent abnormal heating of the surge absorbing element. This surge absorber is shown in FIGS. 4 and 5.

In the surge absorber of PCT Application No. JP90/01006, a first lead 17, a second lead 18 and a third lead 19, are attached to a base plate 16. One end of metal wire 15 having spring elasticity is welded to an end of the first lead 17. A surge absorbing element 14 is connected between the second lead 18 and the third lead 19 through lead wires 14a and 14b. The metal wire 15 is attached, as by a weld, to one end of the first lead 17, and is bent in a spring-loaded position in the direction of the surge absorbing element 14. The other end of the bent spring-loaded wire 15 is attached by solder 28 to one end of lead wire 14a, which is connected to the second lead 18. The metal wire 15 and the surge absorbing element 14 are encased within casing 24, which is attached to base plate 16.

As shown in FIG. 5, the first lead 17 is connected to an input line 11a of an electronic device 10, the second lead 18 is connected to an input line 11b of electronic device 10, and the third lead 19 is connected to electronic device 10. While the metal wire 15 does not blow, i.e., disconnect, when a surge voltage is instantaneously applied to the above surge absorber, it does blow to prevent a current flowing to the surge absorbing element 14 when subjected to large current at an overvoltage.

In particular, when a small current at an overvoltage flows, solder 28 is melted by heat generated by both the current and the surge absorbing element 14, and wire 15 releases from its spring-loaded position and disconnects from its attachment to lead wire 14a thereby preventing the current from flowing to the surge absorbing element 14. However, if the surge voltages are repeatedly applied to the surge absorber, wire 15 loses its spring elasticity because it is repeatedly annealed by the heat of the surges. As a result, it may not spring back and detach from lead wire 14a.

Consequently, the small current at the overvoltage continues to flow into the surge absorbing element, the surge absorbing element is abnormally heated by the current and causes the electronic device as well as other electronic devices surrounding the surge absorber to catch fire. For the above reasons, this surge absorber cannot pass the U.L. safety standard.

Moreover, when the surge absorbing circuit has become opened by the blowing of a metal wire or melting of the solder, it is troublesome to remove and replace. Furthermore, it is difficult to visually detect the blown state because of the casing which covers the surge absorber.

SUMMARY OF THE INVENTION

It is an object of this invention to provide a thermal response switch which can be manually reset when the application of continuous overvoltages or overcurrents has stopped. It is another object of this invention to provide a thermal response switch which does not suffer from poor contact of contacting points due to vibration.

It is still another object of this invention to provide a surge absorbing circuit which prevents abnormal and deleterious heating of the surge absorbing element, and protects the electronic devices from thermal damage, catching fire, and the like when continuous overvoltages or overcurrents flow in the circuit.

We have discovered that these objects can be achieved in the inventive resettable thermal response switch which comprises:

a. first connecting means for electrically connecting the switch to the signal means and second connecting means for connecting the switch to the device;

b. a thermally activated member conductively attached to each of the first and second connecting means;

c. an electrically conductive element movable between a connecting position wherein it is in electrically conductive contact with each member, and a non-connecting position wherein it is out of electrically conductive contact with each member. Each of the thermally activated members is movable in response to temperature. When its temperature is below a predetermined value, it moves to a holding position wherein each member cooperates with the other to hold the element in the connecting position. When its temperature is above the predetermined value, it moves to a non-holding position wherein the element is not held and is in the non-connecting position;

d. spring means which bias the element into the connecting position and conductive contact with each member when each member is in the holding position to establish conductive contact between the first and second connecting means, and which move the electrically conductive element into the non-connecting position when the members are in the non-holding position, whereby conductive connection between the first and second connecting means is disrupted; and e. pin means for moving the element from the non-connecting to the connecting position.

An additional embodiment of this invention is formed by replacing the thermally activated member attached to the second connection means and the biasing spring means with a thermally activated conductive spring means which provides electrically conductive contact between the element and the second connecting means. In addition, to providing the electrical connection, the thermally activated spring means biases the element into the connecting position and conductive contact with the member when the member is in the holding position, and moves the electrically conductive element into the non-connecting position when its temperature is greater than the predetermined value and the member is in the non-holding position, whereby the conductive connection between the first and second connecting means is disrupted.

BRIEF DESCRIPTION OF THE DRAWINGS

Various other objects and purposes of the invention will become evident from the following detailed description taken in connection with the accompanying drawings.

DESCRIPTION OF THE PREFERRED EMBODIMENT

Figure 1:
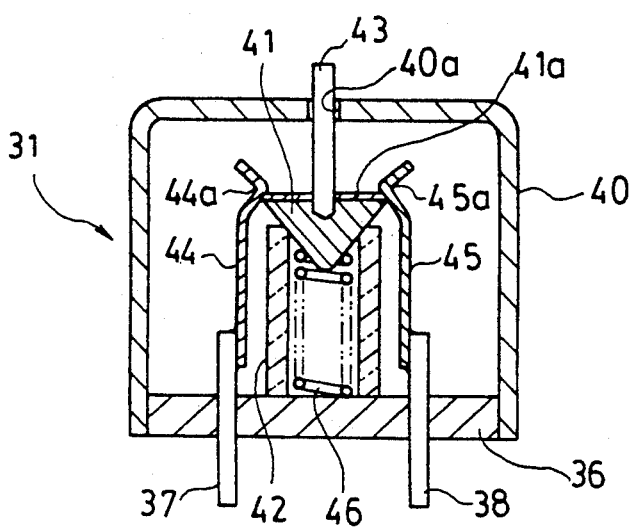
FIG. 1 is a sectional view of the thermal response switch embodying this invention.

In operation, when a surge voltage is instantaneously applied to the communication lines, the thermal response switch remains in the closed or on position and the surge absorbing element acts to suppress the surge voltage. When an overvoltage or overcurrent is continuously applied to the communication lines, the thermal response switch is heated because it itself is a resistor. When the temperature of the thermal response pieces rises up to a predetermined temperature, the thermal response pieces open and simultaneously release the movable body due to elastic force of the spring to thereby project the reset pin through the through hole in the casing. The thermal response switch becomes opened, thus stopping the continuous overvoltage or overcurrent from flowing to the electronic device and the surge absorbing element.

Successively, the reset pin is pushed by manual operation after the temperature of the thermal response pieces decreases to the predetermined temperature or less to restore the thermal response pieces. The movable body becomes supported firmly by the thermal response pieces to thereby connect the electronic device and the surge absorbing element to the communication lines even if a vibration is added to the thermal response switch.

The thermal response switch used for this invention is a normally-closed switch opened by thermal transformation and made of conductive materials, such as, a bimetallic or shape memorizing alloy and the like. The thermal response switch usually has an operation starting temperature range of 80° to 120° C. because the electronic devices used together with the surge absorbing element normally have a maximum operating temperature of 85° C. Bimetallic elements suitable for use in the thermal response switch of the invention include those comprising a joined body of two metal pieces wherein one metal piece has a different thermal expansion coefficient from that of the other metal pieces, e.g. a brass-nickel steel joined body having a thermal transformation starting temperature range of 80° to 100° C., a manganese-Invar joined body having a thermal transformation starting temperature range of 100° to 150° C. or a brass-Invar joined body having a thermal transformation starting temperature range of 100° to 150° C. Shape memorizing alloys suitable for use in the thermal response switch include nickel-titanium alloy which can adjust the transformation point up to 90° C. or a copper-zinc-aluminum alloy which can adjust the transformation point up to 100° C.

The surge absorbing element used for this invention may be a semiconductor type surge absorber, such as, a zinc oxide varistor, a carbon silicate varistor or a Zener diode, a filter type surge absorber, such as, a CL filter made by combining a condenser with a coil or a CR filter made by combining a condenser with a resister, and a gap type discharge tube, such as, an air gap type absorber or micro-gap type absorber.

In this specification, the term "an overvoltage or overcurrent" means an abnormal voltage above a discharge starting voltage of a surge absorbing element or an abnormal current accompanied by the abnormal voltage.

This invention will be explained according to preferred embodiments to describe concrete examples.

EXAMPLE 1

Figure 2:
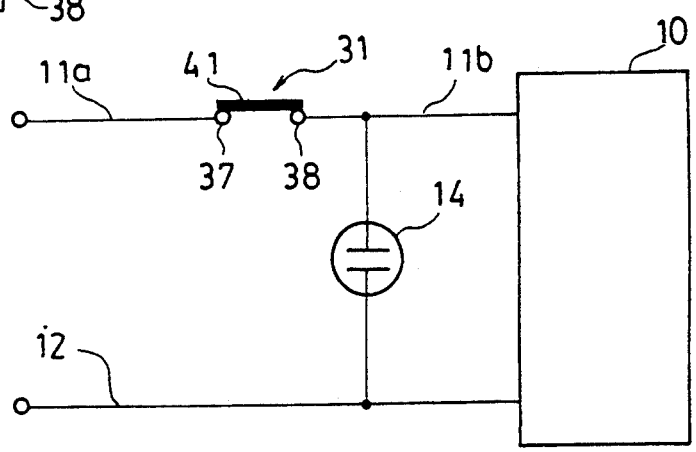
FIG. 2 is a block diagram of a surge absorbing circuit including the inventive thermal response switch.

Referring to FIGS. 1 and 2, a surge absorbing element 14 is parallel connected to an electronic device 10 of communication equipment across communication lines 11b and 12. The input of the surge absorbing element is connected to communication line 11b. A thermal switch 31, that is opened by heating and closeable upon cooling, is serially connected between communication lines 11a and 11b.

In this embodiment, the surge absorbing element 14 is a micro-gap type discharge tube having a discharge starting voltage of 300 volts. This surge absorbing element 14 is manufactured by coating a columnar ceramic element with a conductive thin film, forming microgaps of several tens of micrometers which ar perpendicular to the ceramic element on a surface of the coated ceramic element, attaching cap electrodes to both ends of the coated ceramic element, connecting lead wires to the cap electrodes and then enclosing the resulting product with an inert gas in a glass tube. Refer to prior U.S. patent application No. 798,528, filed Nov. 26, 1991.

Both pin-shaped leads 37 and 38 are separated from each other and fixed through an insulator base plate 36 of the inventive thermal response switch 31. The leads 37 and 38 are made of conductive material, e.g., for this example, the leads are made of iron-nickel alloy. The lead 37 is connected to the communication line 11a and the lead 38 is connected to the communication line 11b. A casing 40 covering the base plate 36 is attached to the base plate 36. The casing 40 has a through hole 40a located at a position opposite from the base plate 36. A conic movable body 41 having a conductive part 41a on an upper surface thereof is provided inside the casing 40 and is caught at the upper end of a glass tube 42 fixed to the base plate 36. A reset pin 43 is attached to a central part of the upper surface of the movable body 41. The reset pin 43 projects from the through hole 40a, and the movable body 41 is adapted to contact the glass tube 42 when the reset pin 43 is pushed manually.

Each lower end of a pair of thermal response pieces 44 and 45 is connected to the leads 37 and 38 inside the casing, respectively. For this example, each of the thermal response pieces 44 and 45 is a bimetallic piece that is a joined body of two metal pieces of manganese and Invar wherein one metal piece has a different thermal expansion coefficient from that of the other metal piece. Each of the thermal response pieces 44 and 45 is provided at upper parts with narrow necks 44a and 45a, respectively, which hold the movable body 41 attached to the glass tube 42, and which electrically connect leads 37 and 38. The thermal response pieces 44 and 45 are transformed and expanded by heat at temperature of 100° C. or more to thereby release the movable body 41. A coil spring 46 is provided inside the glass tube 42. The spring 46 is compressed so as to touch the held movable body 41 with pressure and to push the conductive portion 41a of movable body 41 away from the thermal response pieces 44 and 45 when the movable body 41 is released.

In the surge absorbing circuit thus composed, when an overvoltage and overcurrent are continuously applied to communication lines 11a, 11b, and 12, the thermal response pieces 44 and 45 of the thermal response switch 31 generates heat because they themselves are resistors. When the temperature of the thermal response pieces 44 and 45 rises up to a predetermined temperature, the thermal response pieces 44 and 45 open. Simultaneously, the movable body 41 is released due to elastic force of the spring which projects the reset pin 43 through the through hole 40a. The thermal response switch 31 becomes opened, thus stopping the continuous overvoltage or overcurrent from flowing to the electronic device 10 and the surge absorbing element 14.

Successively, the reset pin 43 is pushed by manual operation after the temperature of the thermal response pieces 44 and 45 decreases to the predetermined temperature or less to restore the thermal response pieces 44 and 45. Consequently, the movable body 41 becomes supported firmly by the thermal response pieces 44 and 45 to thereby reconnect the electronic device 10 to the communication lines 11a, 11b, and 12. Contacting the conductive part 41a of the movable body 41 with the thermal response pieces 44 and 45 becomes ensured because a elastic force of the spring 46 acts, thereby resulting in a high vibration-proof thermal response switch 31.

Operation conditions of the thermal response switch 31 can be easily checked by visually looking at the extent to which the reset pin 43 protrudes from the through hole.

EXAMPLE 2

Figure 3:
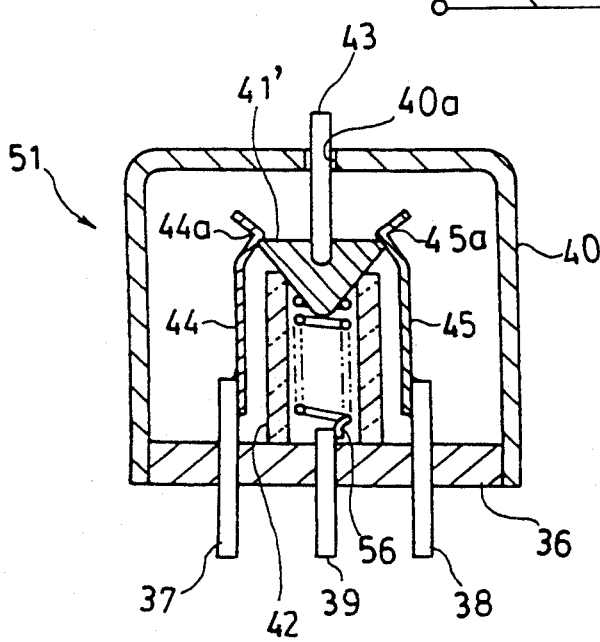
FIG. 3 is a sectional view of another thermal response switch embodying this invention.
Figure 4:
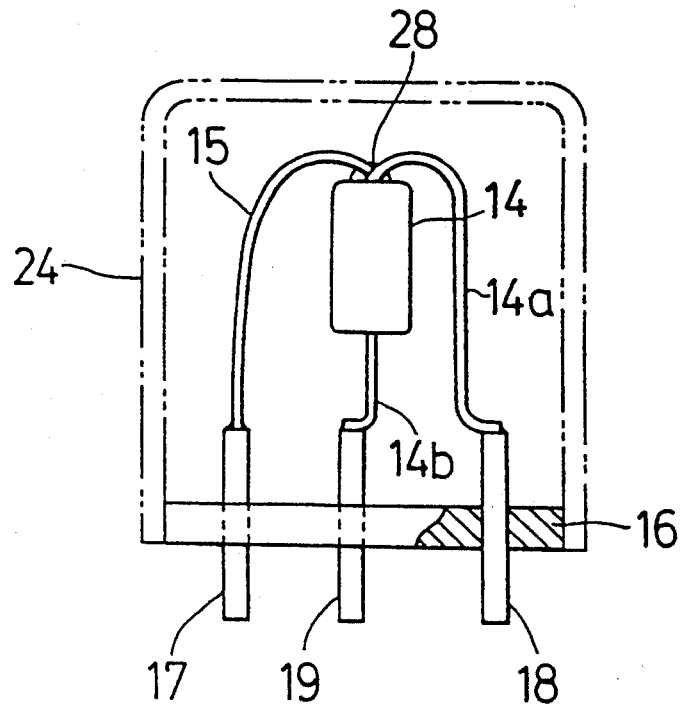
FIG. 4 is a front view of a prior art surge absorber.
Figure 5:
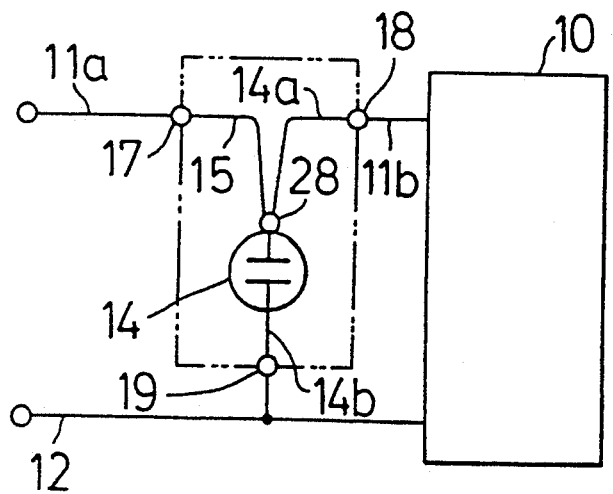
FIG. 5 is a block diagram of a surge absorbing circuit including the prior art surge absorber.

Next, FIG. 3 shows another embodiment of this invention. In FIG. 3, the same numerals as shown in FIG. 1 illustrate the same parts as shown in FIG. 1.

A thermal response switch 51 for this example provides a third lead 39 through the insulator base plate 36, in addition to the first and second leads 37 and 38. A lower end of a coil spring 56 having conductivity and thermal respondency is connected to the lead 39. An upper end of the spring 56 touches the movable body 41' of conductive material with pressure. The spring 56 extends so as to push away the movable body 41' from the thermal response pieces 44 and 45 by heating. The spring 56 is also composed so as to electrically disconnect the leads 37 and 38 by lifting the movable body 41' off the thermal response pieces 44 and 45, and to simultaneously cause the reset pin 43 to project through the through hole 40a.

One or both of the leads 37 or 38 ar connected to the communication line 11a and the lead 39 is connected to the communication line 11b, respectively. Repeated explanation is omitted because operations of this surge absorbing circuit are the same as those of the circuit in the above Example.

In the surge absorbing circuit of Examples 1 and 2, tests in which an overvoltage or overcurrent is applied were executed. The thermal response switches 31 and 51, and the surge absorbing element 14 were connected to the communication lines 11a, 11b and 12, and the electronic device 10, respectively, as shown in FIG. 2. A relatively small electric current of an overvoltage, i.e., an electric current of 2.2 A at AC 600 volts, was passed through communication lines 11a and 12 of the test circuits for 30 minutes.

As the result, in Example 1, the circuit was disconnected at about three seconds after applying an overvoltage. Once the circuit was disconnected, the circuit was not restored even after removing an overvoltage. However the circuit could be restored by pushing the reset pin 43 into the casing 40. Once in the restored condition, a vibration was applied by the use of a stick having rubber around the pointed end, the circuit was not disconnected. Example 2 was the same result as Example 1.

What is claimed is:

1. A resettable thermal response switch for protecting an electronic device having signal means connected thereto which comprises:
   a. first connecting means for electrically connecting the switch to the signal means and second connecting means for connecting the switch to the device;
   b. a thermally activated member conductively attached to each of the first and second connecting means;
   c. an electrically conductive element movable between a connecting position wherein it is in electrically conductive contact with each member, and a non-connecting position wherein it is out of electrically conductive contact with each member, each member being movable in response to temperature between a holding position when its temperature is below a predetermined value in which position each member cooperates with the other to hold the element in the connecting position, and a non-holding position when its temperature is above the predetermined value wherein the element is not held and is in the non-connecting position;

d. spring means which bias the element into the connecting position and conductive contact with each member when each member is in the holding position to establish conductive contact between the first and second connecting means, and which move the electrically conductive element into the non-connecting position when the members are in the non-holding position, whereby conductive connection between the first and second connecting means is disrupted; and e. pin means for moving the element from the non-connecting to the connecting position.

2. The switch of claim 1 wherein each thermally activated member is positioned opposite another member, and when in the holding position, hold the electrically conductive element therebetween.

3. The switch of claim 2 which further comprises a casing forming a chamber, each thermally activated members, electrically conductive element and spring means being within the chamber, a portion of the connecting means protruding exterior of the chamber, and the pin means comprises a pin secured to the electrically conductive element and which protrudes and is accessible from exterior of the chamber.

4. The switch of claim 2 wherein pin means is movable between first and second visible indicating positions and is in the first position when the element is in the connecting position and is in the second position when the element is in the non-connecting position.

5. A resettable thermal response switch for protecting an electronic device having signal means connected thereto which comprises:
  a. first connecting means for electrically connecting the switch to the signal means and second connecting means for connecting the switch to the device;
  b. a thermally activated member conductively attached to the first connecting means;
  c. an electrically conductive element movable between a connecting position wherein it is in electrically conductive contact with each member, and a non-connecting position wherein it is out of electrically conductive contact with each member, each member being movable in response to temperature between a holding position when its temperature is below a predetermined value in which position each member cooperates with the other to hold the element in the connecting position, and a non-holding position when its temperature is above the predetermined value wherein the element is not held and is in the non-connecting position;
  d. thermally activated conductive spring means in electrically conductive contact with the element and the second connecting means which bias the element into the connecting position and conductive contact with the member when the member is in the holding position, and move the electrically conductive element into the nonconnecting position when its temperature is greater than the predetermined value and the member is in the non-holding position, whereby the conductive connection between the first and second connecting means is disrupted; and
  e. pin means for moving the element from the non-connecting to the connecting position.

6. The switch of claim 5 wherein each thermally activated member is positioned opposite another member, and when in the holding position, hold the electrically conductive element therebetween.

7. The switch of claim 6 which further comprises a casing forming a chamber, each thermally activated members, electrically conductive element and spring means being within the chamber, a portion of the connecting means protruding exterior of the chamber, and the pin means comprises a pin secured to the electrically conductive element and which protrudes and is accessible from exterior of the chamber.

8. The switch of claim 6 wherein pin means is movable between first and second visible indicating positions and is in the first position when the element is in the connecting position and is in the second position when the element is in the non-connecting position.

9. The switch of claim 1 wherein the member is formed from a shape memorizing alloy.

10. The switch of claim 5 wherein the member is formed from a shape memorizing alloy.

11. The switch of claim 5 wherein the spring means is formed from a shape memorizing alloy.

12. A surge absorbing circuit for a device having communication lines attached thereto comprising:
  a. a surge absorbing element connected across the communication lines;
  b. a thermal response switch connected to a communication line on an input side of the surge absorber, said switch comprising:
    i. first connecting means for electrically connecting the switch to the signal means and second connecting means for connecting the switch to the device;
    ii. a thermally activated member conductively attached to each of the first and second connecting means;
    iii. an electrically conductive element movable between a connecting position wherein it is in electrically conductive contact with each member, and a non-connecting position wherein it is out of electrically conductive contact with each member, each member being movable in response to temperature between a holding position when its temperature is below a predetermined value in which position each member cooperates with the other to hold the element in the connecting position, and a non-holding position when it temperature is above the predetermined value wherein the element is not held and is in the non-connecting position;
    iv. spring means which bias the element into the connecting position and conductive contact with each member when each member is in the holding position to establish conductive contact between the first and second connecting means, and which move the electrically conductive element into the non-connecting position when the members are in the non-holding position, whereby conductive connection between the first and second connecting means is disrupted; and v. pin means for moving the element from the non-connecting to the connecting position.

13. The circuit of claim 12 wherein each thermally activated member is positioned opposite another member, and when in the holding position, hold the electrically conductive element therebetween.

14. The circuit of claim 13 which further comprises a casing forming a chamber, each thermally activated members, electrically conductive element and spring means being within the chamber, a portion of the connecting means protruding exterior of the chamber, and the pin means comprises a pin secured to the electrically conductive element and which protrudes and is accessible from exterior of the chamber.

15. The circuit of claim 13 which further comprises a casing forming a chamber, each thermally activated members, electrically conductive element and spring means being within the chamber, a portion of the connecting means protruding exterior of the chamber, and the pin means comprises a pin secured to the electrically conductive element and which protrudes and is accessible from exterior of the chamber.

16. A surge absorbing circuit for a device having communication lines attached thereto comprising:
   a. a surge absorbing element connected across the communication lines;
   b. a thermal response switch connected to a communication line on an input side of the surge absorber, said switch comprising:
      i. first connecting means for electrically connecting the switch to the signal means and second connecting means for connecting the switch to the device;
      ii. a thermally activated member conductively attached to the first connecting means;
      iii. an electrically conductive element movable between a connecting position wherein it is in electrically conductive contact with each member, and a non-connecting position wherein it is out of electrically conductive contact with each member, each member being movable in response to temperature between a holding position when its temperature is below a predetermined value in which position each member cooperates with the other to hold the element in the connecting position, and a non-holding position when its temperature is above the predetermined value wherein the element is not held and is in the non-connecting position; activated conductive spring means
      iv. thermally activated conductive spring means in electrically conductive contact with the element and the second connecting means which bias the element into the connecting position and conductive contact with the member when the member is in the holding position, and move the electrically conductive element into the non-connecting position when its temperature is greater than the predetermined value and the member is in the non-holding position, whereby the conductive connection between the first and second connecting means is disrupted; and
      v. pin means for moving the element from the non-connecting to the connecting position.

17. The circuit of claim 16 wherein each thermally activated member is positioned opposite another member, and when in the holding position, hold the electrically conductive element therebetween.

18. The circuit of claim 17 which further comprises a casing forming a chamber, each thermally activated members, electrically conductive element and spring means being within the chamber, a portion of the connecting means protruding exterior of the chamber, and the pin means comprises a pin secured to the electrically conductive element and which protrudes and is accessible from exterior of the chamber.

19. The circuit of claim 17 wherein pin means is movable between first and second visible indicating positions and is in the first position when the element is in the connecting position and is in the second position when the element is in the non-connecting position.

20. The circuit of claim 17 wherein the member is formed from a shape memorizing alloy.

* * * * *